US005274421A

United States Patent [19]

Takahashi

[11] Patent Number: 5,274,421

[45] Date of Patent: Dec. 28, 1993

[54] IMAGE FORMING APPARATUS HAVING AUTO/MANUAL EXPOSURE AMOUNT SETTING MODE CHANGING MEANS

[75] Inventor: Kazutaka Takahashi, Yamato, Japan

[73] Assignee: Kabushiki Kaisha Toshiba, Kawasaki, Japan

[21] Appl. No.: 856,627

[22] Filed: Mar. 24, 1992

[30] Foreign Application Priority Data

Mar. 29, 1991 [JP] Japan .................................. 3-91644

[51] Int. Cl.[5] ...................... G03G 15/04; G03B 27/72

[52] U.S. Cl. ...................................... 355/69; 355/208; 355/214

[58] Field of Search ................ 355/69, 208, 214, 228, 355/229

[56] References Cited

U.S. PATENT DOCUMENTS

| | | | |
|---|---|---|---|
| 4,361,395 | 11/1982 | Washio et al. | 355/214 |
| 4,542,985 | 9/1985 | Honma et al. | 355/69 |
| 4,640,603 | 2/1987 | Honma | 355/214 |
| 4,699,502 | 10/1987 | Araki et al. | 355/214 |
| 4,714,945 | 12/1987 | Fujiwara et al. | 355/69 |
| 4,796,060 | 1/1989 | Mizude | 355/69 X |
| 4,910,554 | 3/1990 | Noda | 355/214 X |
| 4,974,022 | 11/1990 | Nezu | 355/230 |

FOREIGN PATENT DOCUMENTS 2-39168 2/1990 Japan .

*Primary Examiner*—Fred L. Braun

*Attorney, Agent, or Firm*—Foley & Lardner

[57] ABSTRACT

An image forming apparatus for forming an image based on an original image of an original on an image carrying member. The apparatus has an auto exposure amount setting mode and a manual exposure amount setting mode. Reflected light from the original image device is detected. A manual device can be moved from a first position to a second position by manual operation, for setting the exposure amount according to a varied amount. Included are a first energizing device for energizing the emitting device on the basis of a result of detecting of the detecting device in the auto exposure amount setting mode, a second energizing device for energizing the emitting device according to the setting of the setting device, a device for determining if a difference between the first position and the second position is larger than a predetermined value, and a device for changing the auto exposure amount setting mode to the manual amount setting mode when the determining device determines the varying condition in the auto exposure amount setting mode.

5 Claims, 4 Drawing Sheets

IMAGE FORMING APPARATUS HAVING AUTO/MANUAL EXPOSURE AMOUNT SETTING MODE CHANGING MEANS

BACKGROUND OF THE INVENTION

1. Field of the Invention

The present invention relates to an image forming apparatus such as an electronic copy machine having an auto density control mode and a manual density control mode.

2. Description of the Related Art

In general, an electronic copy machine comprises an auto density control mode, which automatically adjusts density control of a image lamp in accordance with density of an original document, and a manual density control mode which can arbitrarily change density of a image regardless of density of the original document.

Conventionally, as described in Japanese Patent Disclosure (Kokai) No. 2-39168, in the copy machine, which in the manual density control mode changing development bias voltage uses a slide volume, data at the position of the slide volume is read and development bias voltage is adjusted based on this data. In this machine, in order to manually set the density, a slide volume on the operation panel is moved to a suitable density position, and the mode of this machine is changed to manual mode.

However, in a machine having an automatic mode changing function, when the operator touches the slide volume by mistake, the mode is erroneously changed to a manual mode opposite to the operator's intention. Therefore, it is a problem that if the operator carries out copying by changing to the manual mode, the copier would probably miss a copy.

SUMMARY OF THE INVENTION

An object of the present invention is to provide an image forming apparatus which prevents changing the auto density mode to the manual density mode by moving the slide volume opposite to the operator's intention.

An image forming apparatus of this invention forms an image based on an original image of an original on an image carrying member, the apparatus having an auto exposure amount setting mode and a manual exposure amount setting mode. The apparatus also has a means for emitting light to the original image to expose the image carrying member. Reflected light from the original image means detects the density of the original image by the reflected light means. An operator using the manual exposure amount setting mode can vary an exposure amount onto the image carrying member. The receiving means is moved from a first position to a second position by the operation means for setting the exposure amount according to a varied amount by the receiving means operation first energizing means for energizing the emitting means on the basis of a result of detecting of the detecting means in the auto exposure amount setting mode. A second energizing means energizes the emitting means according to the setting of the setting means, for determining that a difference between the first position and the second position is larger than a predetermined value, and means for changing the auto exposure amount setting mode to the manual amount setting mode when the determining means determines the varying condition in the auto exposure amount setting mode.

According to the present invention, since the changing means changes to the manual exposure amount setting mode from the auto exposure amount setting mode only when a signal from the exposure amount setting means falls outside a predetermined range. Therefore, when the operator touches the slide volume and moves it a little by mistake, the auto mode is not changed to the manual mode, and it is possible to prevent the apparatus from changing the mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be explained with reference to the drawings.

Figure 3:
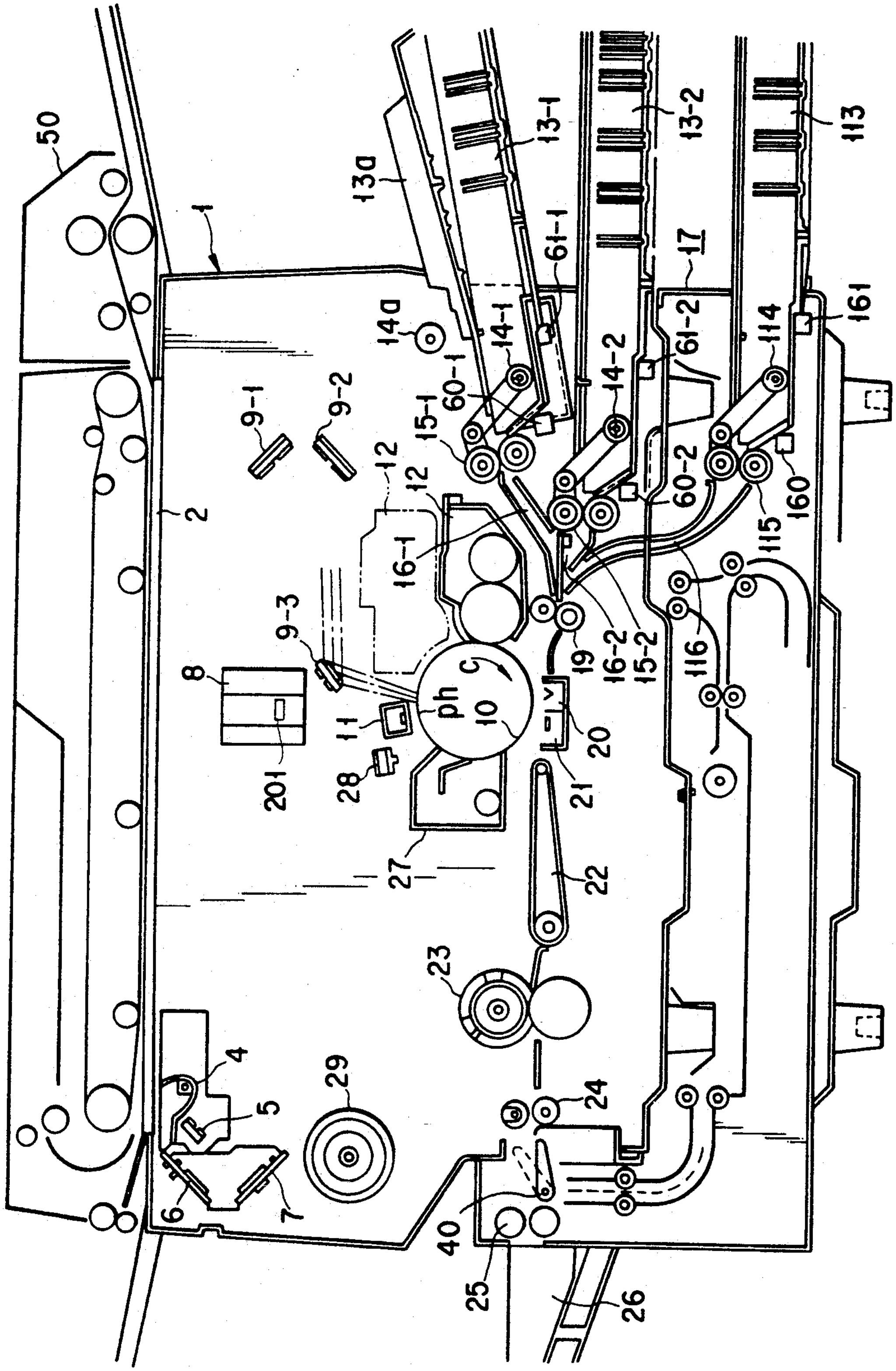
FIG. 3 is a structural view showing an electronic copy machine as an example of the image forming apparatus.

FIG. 3 schematically shows an electronic copy machine as an example of the image forming apparatus according to the present invention.

An original paper holding plate (transparent glass) 2 is fixed onto the upper surface of a main body of a copy machine 1. An auto original paper feeding device 50, which automatically feeds the original paper to a position to be mounted (standard set value), is provided on the upper portion of the original manuscript paper holding plate 2, and a plurality of documents can be continuously fed. Since the auto original paper feeding deeding device 50 freely opens and closes to the original paper holding plate 2, the original papers can be manually set one by one.

The original papers mounted on the document holding plate 2 are exposed and scanned by a reciprocating optical system, which comprises an exposure lamp 4, mirrors 5, 6 and 7, moving along the lower surface of the document holding plate 2. In this case, the mirrors 6 and 7 are moved at a ½ speed of the mirror 5 so as to maintain a constant optical path length.

Light reflected upon the document by scanning the optical system, that is, radiation of the exposure lamp 4, is reflected upon the mirrors 5, 6 and 7. Thereafter, the reflected light passes through a variable power lens block 8 and is further reflected by mirrors 9-1, 9-2, and 9-3 and guided to a photosensitive drum 10 image of the original paper is formed on the surface of the photosensitive drum 10.

A density of the original paper is detected by means of an optical sensor 201 detecting a reflected light emitted from the exposure lamp 4. A signal from the sensor is supplied to a microprocessor 70 to be described later. The exposure amount setting in the auto mode is determined in accordance with a signal from the sensor 201.

The photosensitive drum 10 is rotated in a direction of arrow c, and the surface is charged by a charger 11. Thereafter, the image is slit-exposed by an exposing section Ph, thereby an electrostatic latent image is formed on the surface. The electrostatic latent image is visualized by adhesion of toner by a developing device 12.

The developing device 12 is detachable from the main body of the copy machine 1. Moreover, code data (not shown) showing a color of contained toner is stored in a side surface of the developing device 12. Due to this, if the developing device 12 is inserted to the main body of the copy machine 12, code data is read by a sensor (not shown) provided in the main body of the copy machine 1, and the color of toner can be automatically discriminated.

On the other hand, paper (material to be transferred) is taken out of a selected upper stage paper feeding cassette 13-1, a lower stage paper feeding cassette 13-2, and a third stage (additional) paper feeding cassette 113 one by one by delivery rollers 14-1, 14-2, or 114 and a pair of rollers 15-1 and 15-2, or 115. Paper taken out of the cassettes is guided to a pair of resist rollers 19 through paper guiding paths 16-1 and 16-2 or 116, and sent to a transferring section by the pair of resist rollers 19.

The paper feeding cassettes 13-1 and 13-2 are detachably provided on the lower end portion of the right side of the main body of the copy machine 1. Moreover, the third stage paper cassette 113 is detachably provided on the right side portion of a paper feeding apparatus 17 provided as an option of the main body of the copy machine 1.

One of the paper feeding cassettes 13-1, 13-2 and 113 can be selected in an operation panel to be described later.

The size of paper, which is stored in the respective paper feeding cassettes 13-1, 13-2 and 113, is detected by each of cassette size detecting switches 60-1, 60-2, and 160. Each of the cassette size detecting switches 60-1, 60-2, and 160 comprises a plurality of microswitches, which are turned on/off in accordance with the insertion of the cassette of the different size.

Moreover, the state of paper, which is stored in the respective paper feeding cassettes 13-1, 13-2 and 113, is detected by each of empty detectors 61-1, 61-2, and 161. Each of the empty detectors 61-1, 61-2, and 161 comprises, for example, a reflection type optical sensor.

Moreover, a manual guide **13*a* is provided on the upper surface portion of the paper feeding cassette 13-1. The paper, which is inserted through the manual guide 13*a*, is guided to the pair of the rollers 15-1 by the delivery roller 14*a*. Thereafter, the paper is sent in the same manner as the paper fed from the paper feeding cassette 13-2**.

The paper sent to the transferring section is closely attached to the surface of the photosensitive drum 10 at the portion of a transferring charger 20, and a toner image on the photosensitive drum 10 is transferred by the action of the charger 20. The transferred paper is electrostatically separated from the photosensitive drum 10 by the function of a separation charger 21, and sent to a pair of fixing rollers 23, which is provided in the final end portion as a fixing device, by a feeding belt 22. Then, a transfer image is fixed by passing the fixing rollers 23. Thereafter, paper is delivered to a tray 26, which is positioned in the outside of the main body 1, by a pair of delivery rollers 24 and 25.

After transferring, residual toner on the surface of the photosensitive drum 10 is removed by a cleaner 27, and an after image is erased by an elimination lamp 28, so that the photosensitive drum 10 is returned to an initial state.

A cooling fan 29 prevents the temperature of the main body 1 from increased.

Moreover, in the mutual portion between the delivery rollers 24 and 25, there is provided a distribution gate 40 distributing the fixed papers to the tray 26 or the paper feeding device 17. The papers distributed to the paper feeding device 17 by the distribution gate 40 are sent to the transferring section again as the papers are maintained as they are or in a state that the front and back are reversed. Thereby, a multiple copy is performed on the same surface of paper or a perfect copy is performed on one paper.

Figure 4:
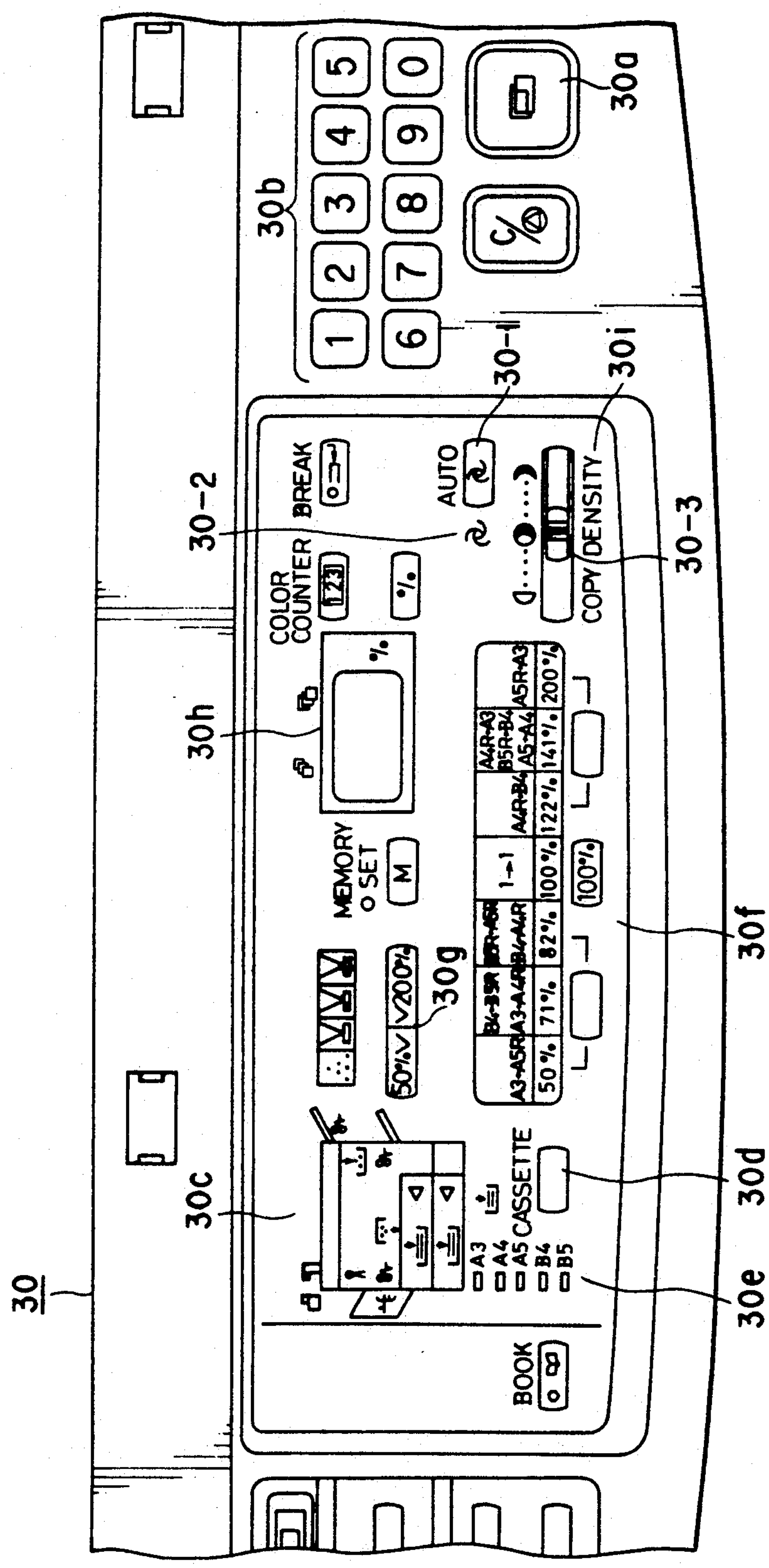
FIG. 4 is a plan view showing one example of an operation panel relating to the embodiment of the present invention.

FIG. 4 shows a main part of an operation panel provided in the main body 1.

In this drawing, the operation panel 30 has a copy key **30*a*, a ten key 30*b*, a state display section 30*c*, a cassette selection key 30*d*, a state display section 30*e*, a magnification setting key 30*f*, a zoom key 30*g*, a magnification displaying section 30*h*, and a copy density setting section 30*i*. The copy key 30*a* instructs the start of the copy, the ten key 30*b* sets a number of copies, the state display section 30*c* displays an operating state of each section and jam of paper, and the cassette selection key 30*d* selects upper, lower, or third stage paper feeding cassetters 13-1, 13-2 and 113. The cassette display section 30*e* displays a size of paper to be selected in the cassette, the magnification setting key 30*f* sets an enlargement or reduction ratio of the copy based on a predetermined relationship, the zoom key 30*g* sets an enlargement or reduction ratio at random, the magnification, and the copy section 30*h* displays a set magnification, and the copy density setting section 30*i*** sets copy density.

The copy density section comprises an auto exposure amount setting key 30-1 of a momentary switch setting an auto exposure amount setting mode, a display LED 30-2 displaying the set auto exposure amount setting mode, and a slide volume 30-3 for adjusting exposure amount in the manual exposure amount setting mode.

Figure 1:
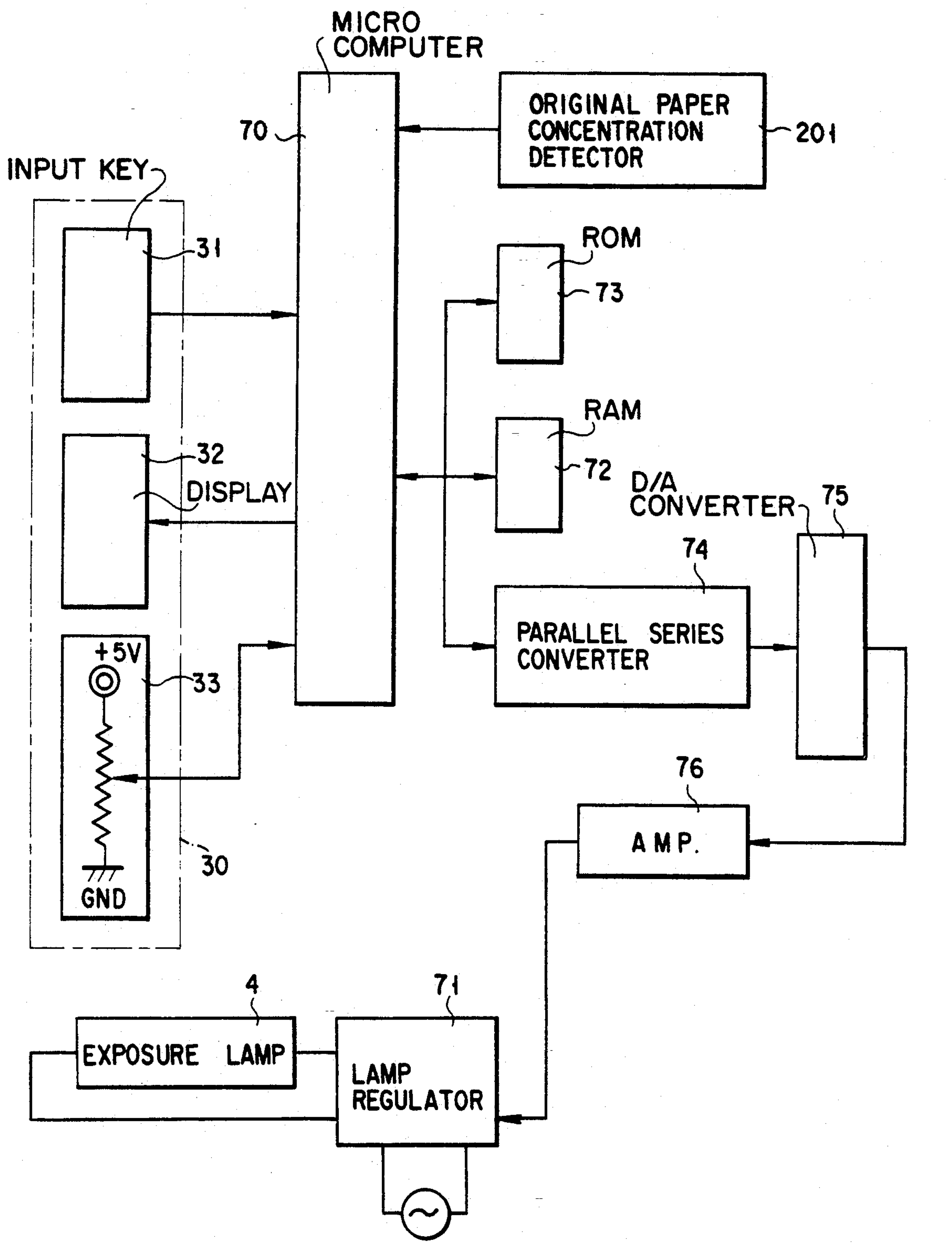
FIG. 1 is a block diagram showing the main structure of an electric circuit relating to an embodiment of the present invention.

FIG. 1 shows a main portion of an electronic circuit.

A microcomputer 70 detects the input from a key section 31 such as the ten key **30*b* of the operation panel 30, the auto exposure amount setting key 30-1, controls the output to a display section 32 such as the state displaying section 30*c*, the display LED 30-3. Moreover, the microcomputer 70 controls a high pressure transformer (not shown) driving various chargers and a lamp regulator 71 of the exposure lamp 4**.

Moreover, a density detecting sensor 201 detecting density of the original paper, a RAM 72 storing an A/D convert value in which the value of the slide volume 30-3 is read and A/D-converted, a ROM 73 storing exposure amount data for determining exposure amount at the time of the auto exposure setting mode, a parallel-series converter 74 parallel-series converts exposure amount data at the time of the manual exposure amount setting mode or exposure amount data at the time of the auto exposure amount setting mode, are connected to the microcomputer 70. The output of the parallel-series converter 74 is supplied to the lamp regulator 71 via the D/A converter 75, and an AMP 76.

An operation of the control of the copy density in the above-mentioned structure will be explained.

Figure 2:
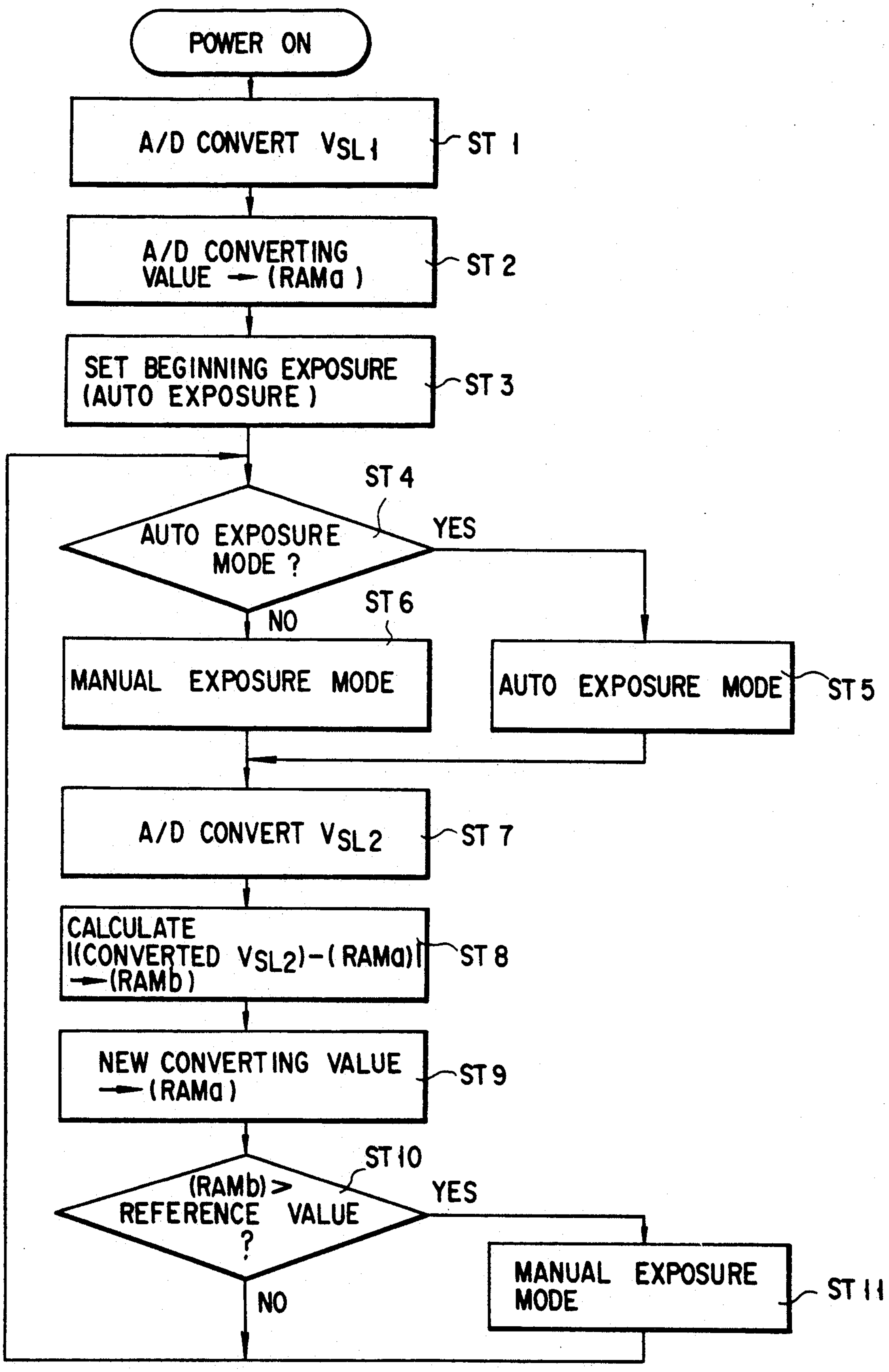
FIG. 2 is a flow chart showing one example of an exposure amount control operation relating to the embodiment of the present invention.

FIG. 2 shows a flow chart of processing of the exposure amount setting operation.

It is assumed that a power of the main body of the copy machine 1 is turned on. A value VSL1 of the slide volume 30-3 is read and A/D-converted in step ST1. The A/D converting value VSL1 is stored in, for example, an area of RAMa of RAM 72 in step ST2.

Thereafter, the beginning of exposure amount is set in step ST3. Of course, the set amount is different from above value of VSL1. In this embodiment, the auto exposure amount setting mode is set.

Sequentially, it is discriminated whether the auto exposure amount setting key 30-1 is turned on or off in the step ST4. If the auto exposure amount setting key 30-1 is turned on, the auto exposure amount setting mode is set in step ST5, and the display LED 30-2 of the operation panel 30 is turned on. If the auto exposure amount setting mode key 30-1 is turned off, the manual exposure amount setting mode is set in step ST6, and the processing goes to step ST7. In this case, the display LED 30-2 of the operation panel 30 is turned off.

In step ST7, the value VSL2 of the slide volume 30-3 is read and A/D-converted again. Then, an absolute value VDF of the difference between the present A/D convert value VSL2 and the A/D convert value VSL1 stored in the RAM 72 is calculated out. The difference value VDF is stored in, for example, an area of RAMb of RAM 72 in step ST8.

In step ST9, the A/D conversion value stored in, for example, the area of RAMa of RAM 72 is rewritten by the value VSL2 of the slide volume 30-3 which is read and A/D-converted in step ST7.

Then in step ST10, the difference data VDF between VSL1 and VSL2 is compared with a predetermined reference value VR (ST10). This reference value VR is set in consideration of the operator's miss level or a degree of an error of reading by the microcomputer 70. In other words, this reference value VR should be larger than a degree which the operator's miss finger touch usually vary the slide volume value.

Above companion of data (ST10) is explained by a following equation (1).

$$|(VSL1)-(VSL2)|>VR \quad (1)$$

And, the difference value VDF is, more concretely, a digital data according a varied voltage value of the slide volume 30-3 between the beginning of move and the end.

If the difference data is larger than the reference value, that is, it is discriminated that the slide volume 30-3 is moved to a certain degree, the mode is reset to the manual exposure mode in step ST11. Due to this, if the copy key **30*a* of the operational panel 30 is operated, exposure of the exposure lamp 4 is controlled by exposure data, which is determined by the new A/D converting value stored in the area of RAMa of RAM 72**.

On the other hand, if the difference data is smaller than the reference value, it is discriminated that there is no change in the slide volume, and the processing goes to step ST4. Then, the above-mentioned steps are repeated. In other words, if the copy key **30*a* is operated in this state, exposure of the exposure lamp 4 is automatically determined in accordance with data of ROM 73** in the case of the auto exposure mode.

In the state that the manual exposure mode is set in advance, similar to the above-mentioned reset, exposure of the exposure lamp 4 is controlled by exposure data, which is determined by the new A/D converting value stored in the area of RAMa of RAM 72.

As mentioned above, the manual exposure mode can be changed from the auto exposure mode only by operating the slide volume according to the operator intention.

In other words, the change of the auto exposure amount setting mode to the manual exposure amount setting mode can be performed only by moving the slide volume without operating the auto exposure amount setting key. Thereby, there is no need for a complicated operation in which the slide volume is controlled after turning of the auto exposure amount setting mode. As a result, the operation can be easily simplified.

It is noted that the present invention is not limited to the above-mentioned embodiment. It is of course that various modifications can be made within the gist of the invention.

As mentioned above, according to the present invention, the auto exposure amount setting mode can be set only by the operation of changing means, thereby making it possible to provide an image forming apparatus whose operation can be simplified.

Furthermore, since the reference value VR for comparison is set at a value which is larger than the degree of the operator's miss, the changing of modes from auto mode to manual mode is carried out only when the operator moves the slide volume 33 enough that his intention to switch to the manual mode is evident.

Additional advantages and modifications will readily occur to those skilled in the art. Therefore, the invention in its broader aspects in not limited to the specific details, and representative devices, shown and described herein. Accordingly, various modifications may be made without departing from the spirit or scope of the general inventive concept as defined by the appended claims and their equivalents.

What is claimed is:

1. An image forming apparatus for forming an image of an original on an image carrying member, the apparatus comprising:
   - means for exposing the original to light of an amount determined in accordance with the density of the image of the original in an auto exposure mode, and exposing the original to light having an operator-desirable amount in a manual exposure mode;
   - means for selecting either the auto exposure mode or the manual exposure mode;
   - means, having a movable portion, for setting the operator-desirable amount in accordance with the position of the movable portion;
   - means for detecting the position of the movable portion of the setting means so as to generate a first value corresponding to the detected position of the movable portion;
   - means for storing a first reference value corresponding to a reference position of the movable portion;

first comparing means for comparing the first reference value with the first value so as to generate a second value corresponding to a difference between the first reference value and the first value;

second comparing means for comparing a second reference value determined in accordance with a predetermined moving range of the movable portion with the second value; and means for changing the auto exposure mode to the manual exposure mode regardless of the state of the selecting means in a case where the second value is larger than the second reference value.

2. An image forming apparatus according to claim 1, wherein the predetermined moving range is larger than an error value reading of the setting means.

3. An image forming apparatus according to claim 1, wherein the setting means includes a slide volume device provided on an operation panel.

4. An image forming apparatus according to claim 1, wherein the detecting means includes an A/D converter for converting analog data corresponding to the position of the movable portion into digital data.

5. An image forming apparatus for forming an image of an original on an image carrying member, the apparatus comprising:

means for exposing the original to light of an amount determined in accordance with the density of the image of the original in an auto exposure mode, and exposing the original to light of an operator-desirable amount in a manual exposure mode;

means for selecting either the auto exposure mode or the manual exposure mode;

means, having a movable portion, for setting the operator-desirable amount in accordance with the position of the movable portion;

means for detecting the position of the movable portion of the setting means, so as to generate a first value corresponding to the detected position of the movable portion;

means for storing a first reference value corresponding to a reference position of the movable portion;

first comparing means for comparing the first reference value with the first value so as to generate a second value corresponding to a difference between the first reference value and the first value;

means for recording the first value in the storing means as a new first reference value after the comparison executed by the first comparing means;

second comparing means for comparing a second reference value determined in accordance with a predetermined moving range of the movable portion with the second value; and means for changing the auto exposure mode to the manual exposure mode regardless of the state of selecting means where the second value is larger than the second reference value, and for causing the exposing means to expose the original to light of an amount corresponding to the first value.

* * * * *